(12) United States Patent
Gfeller et al.

(10) Patent No.: US 6,377,376 B1
(45) Date of Patent: Apr. 23, 2002

(54) OPTOELECTRONIC TRANSCEIVER HAVING EMISSION ANGLE EQUAL TO RECEPTION ANGLE

(75) Inventors: Fritz Gfeller, Rueschlikon; Walter Hirt, Wettswil, both of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/048,749

(22) Filed: Mar. 26, 1998

(51) Int. Cl.$^7$ ............................................. H04B 10/00

(52) U.S. Cl. .................. 359/152; 359/153; 359/142; 359/159; 359/172

(58) Field of Search ................................. 359/152, 153, 359/142, 143, 159, 172

(56) References Cited

U.S. PATENT DOCUMENTS

| 5,280,184 | A | * | 1/1994 | Jokerst et al. | 257/82 |
| 5,349,463 | A | * | 9/1994 | Hirohashi et al. | 359/174 |
| 5,566,022 | A | * | 10/1996 | Segev | 359/172 |
| 5,724,168 | A | * | 3/1998 | Oschmann et al. | 359/172 |
| 5,822,099 | A | * | 10/1998 | Takamatsu | 359/152 |
| 5,959,752 | A | * | 9/1999 | Ota | 359/152 |

* cited by examiner

Primary Examiner—Jason Chan
Assistant Examiner—M. R. Sedighian
(74) Attorney, Agent, or Firm—McGinn & Gibb, PLLC

(57) ABSTRACT

The invention involves an optical wireless communication system comprising a transmitter and a receiver wherein the transmitter has a three-dimensional optical emission characteristic and the receiver has a three-dimensional optical reception characteristic. According to the present invention, the shape of the optical emission characteristic matches the shape of the optical reception characteristic at least within one two-dimensional plane.

16 Claims, 4 Drawing Sheets

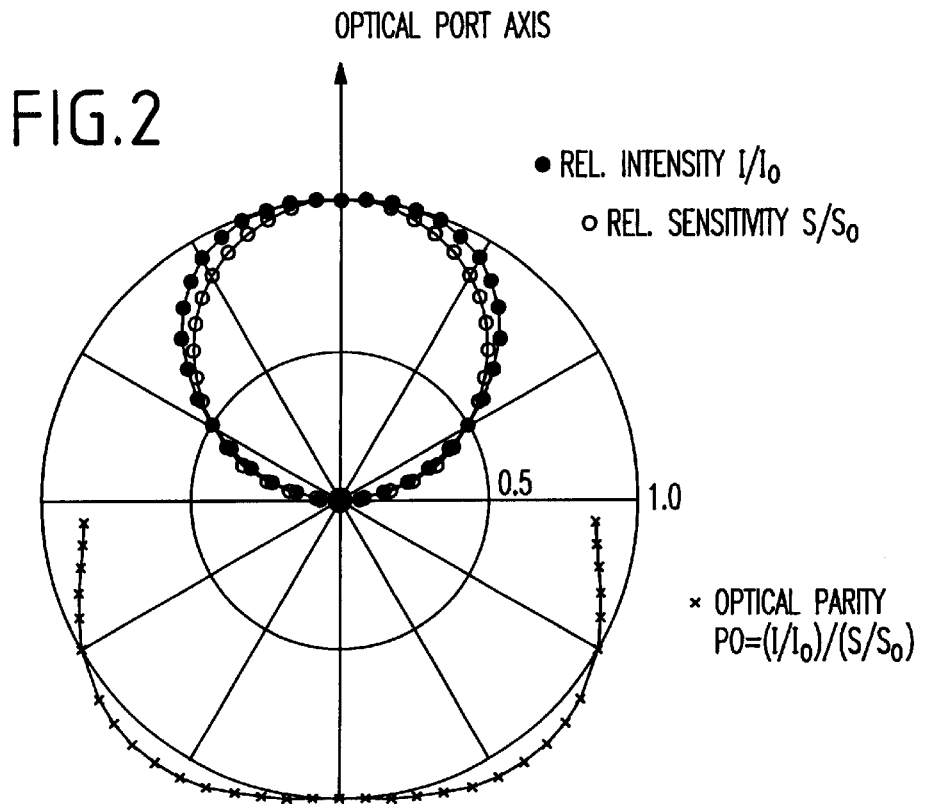
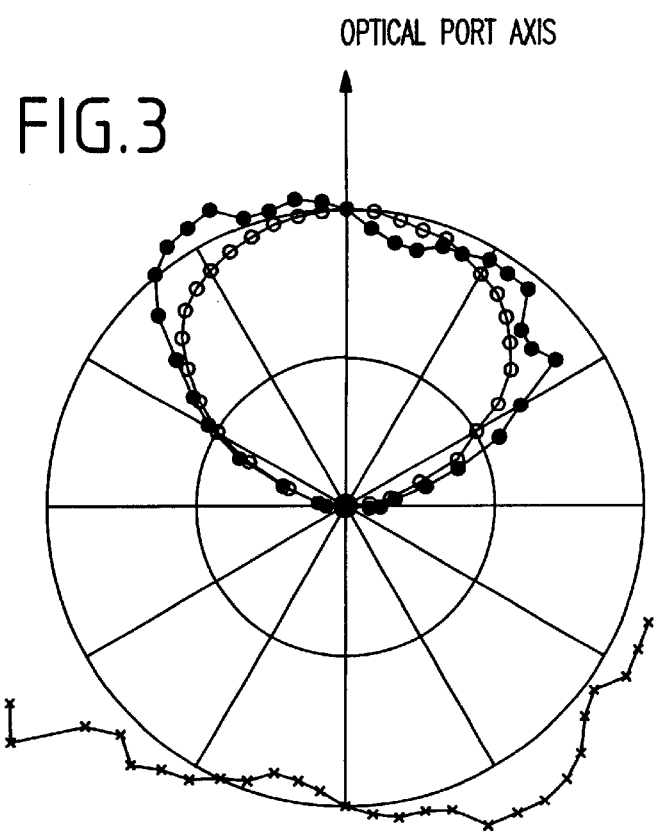

NARROW-ANGLE PORT
1 LED, 1 PD

120° PORT
3 LEDs, 1 PD

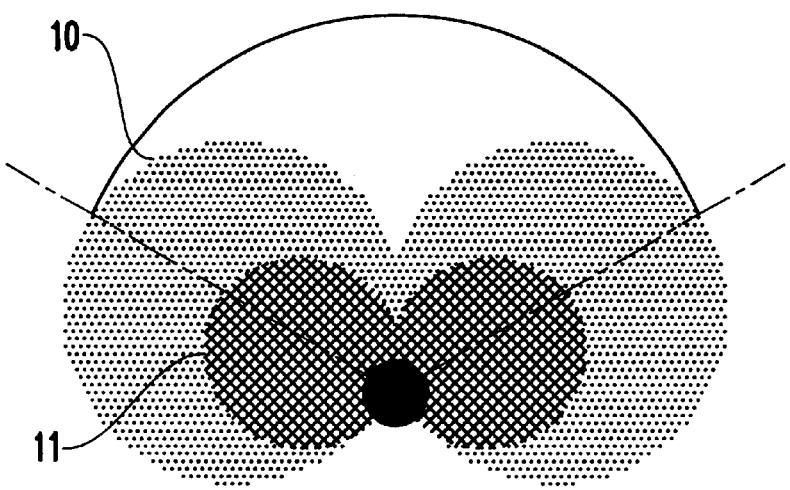
FIG.4C   240° PORT
6 LEDs, 2 PDs
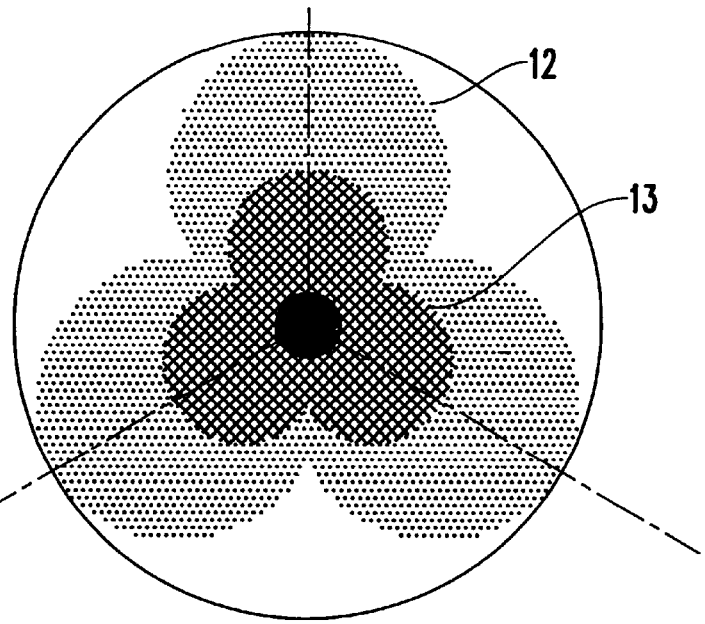
FIG.4D   360° PORT
9 LEDs, 3 PDs

OPTOELECTRONIC TRANSCEIVER HAVING EMISSION ANGLE EQUAL TO RECEPTION ANGLE

TECHNICAL FIELD

The invention concerns transceivers for wireless optical communication.

BACKGROUND OF THE INVENTION

Transceivers of this type consist of an optical transmitter and receiver unit. The intensity of the signal from the transmitting unit and the sensitivity of the receiving unit depend on the angular direction and can be described by means of an emission characteristic an optical reception respectively. However, these respective characteristics of current optical emitter and optical receiver elements exhibit fundamental differences.

Transceivers of this kind are being used in IrDA (Infrared Data Association) applications, for example. The IrDA standard has been defined for data transmission via an optical point to point transmission path. Transceivers usually consist of an infrared transmitter, an infrared receiver and an integrated circuit for signal processing.

A transceiver of the described kind normally has defined ports for signal emission and signal detection. These ports are necessary in order to achieve a particular emission characteristic of the transmitting unit and a particular optical reception characteristic of the receiving unit defined in the IrDA standard. The current IrDA standard defines that the emission angle $\psi_S$ of the emitted signal must have a value of ±15 degrees (half power angle), ensuring that in conjunction with the sensitivity of the receiver the range of transmission is at least 1 m. An additional requirement is that the optical reception characteristic (reception angle $\psi_E$) of the detector, that is the angle for which an illuminated receiver can be rotated with respect to its optical axis until the detected signal has dropped to half the maximum value (half power), must be ±15 degrees. This value also ensures a range of transmission of up to 1 m. However, infrared emitters (e.g., light emitting diode, LED) and infrared receivers (e.g., photodiode, PD) are physically different elements with fundamentally different properties. Furthermore, the emission characteristic (emission angle $\psi_S$) and the optical reception characteristic (reception angle $\psi_E$), respectively the size of the reception angle and the emission angle are largely dependent on the shape of the housing, the number and arrangement of the transmitting and receiving elements, and above all on the shape and the dimensions of lenses or other optical devices in the signal path. In current transceivers a typical emission angle $\psi_S$ might be about ±25 degrees and the angle of reception $\psi_E$ might be about ±60 degrees.

A disadvantage of current transceivers is the fact that the guaranteed range of transmission is limited to only 1 m. Moreover, both communicating devices must be aligned with each other forming an angle of nominally no more than 15 degrees between their optical axes, also referred to as direct-line-of sight arrangement. This arrangement is sufficient for applications relying only on short-range point-to-point links. However, it is not a solution for multi-user networking applications, for example, in office or classroom environments. Multi-user networking requires a reliable collision avoidance scheme. A primary condition that must be satisfied to achieve this objective is the existence of channel reciprocity, meaning, that each participating station must be able to transmit its signals over the same area over which it is able to receive other stations. This condition requires equal shapes of the station's emission and reception characteristics, however, as already stated above, basic optical emitter and optical receiver elements exhibit fundamentally different characteristics. In addition, multi-user networking applications require both increased link distance and increased angular coverage. The present invention is aimed at providing a solution for the optical requirements in such applications.

The limitation to a range of transmission of only 1 m in a cone of 15 degrees is dropped in an extension of the IrDA standard (Advanced IR=AIR). This extension specifies a so-called optical parity requirement for transmitter and receiver to enable multi-user networking applications that rely on channel reciprocity conditions to achieve reliable collision avoidance. Optical parity is given when the ratio of the transmitter's radiant intensity I [mW/sr] and the receiver's sensitivity S [µA/mW/cm$^2$] is constant and remains constant under all operating conditions, specified for example by temperature, data transmission rates, directions, etc. Prior art and current state-of-the-art infrared transceivers violate the optical parity requirement. With the extended standard it is no longer necessary that the cross-section of the cone be circular. An elliptic cross-section of the cone of the emission characteristic and the optical reception characteristic is sufficient.

It is an object of the present invention to provide optoelectronic transmitters and receivers that allow to extend data transmission to longer distances (~10 m) and wider angles (up to ±180 degrees).

It is an object of the present invention to provide optoelectronic transmitters and receivers that meet the optical parity requirement in accordance with the collision avoidance mechanism of an RTS/CTS (Request To Send/Clear To Send) media access protocol.

SUMMARY OF THE INVENTION

A transmitter according to the present invention has an optical emission characteristic described by an emission angle $\psi_S$ (herein referred to as transmitter's half-angle $\psi_S$). $\psi_S$ is the planar angle that defines where the transmitted power is half the power of the power on the transmitter's optical axis. A receiver according to the present invention has an optical reception characteristic described by a reception angle $\psi_E$ (herein referred to as receiver's half-angle $\psi_E$), wherein $\psi_E$ is the planar angle that defines where the sensitivity is half the sensitivity of the receiver's sensitivity on the optical axis. An inventive transceiver is characterized in that it comprises a transmitter and a receiver, wherein the transmitter's half-angle $\psi_S$ is equal or approximately equal to the receiver's half-angle $\psi_E$ within the same plane.

One possible implementation is further characterized in that it provides an angular match of the optical emission and reception characteristics over all emission/reception angles in the horizontal plane.

According to another possible implementation, the transmitter and the receiver are constructed in a way that the three-dimensional optical emission characteristic of the transmitter and the three-dimensional optical reception characteristic of the receiver are identical or at least similar.

According to another implementation, the two-dimensional projection of the optical emission characteristic and optical reception characteristic are identical or at least similar.

The advantages offered by this invention consist in the facts that new transceivers and/or communication systems built according to the present invention comply with the optical parity concept promulgated by the new AIR standard. Furthermore, the transceivers and/or communication systems provide for an increased transmission range and angle. It is another advantage that communicating devices equipped with transmitters/receivers of this kind will not need an alignment as accurate as before. Further advantages are addressed in connection with the detailed description.

DESCRIPTION OF THE DRAWINGS

The invention is described in detail below with reference to the following schematic drawings. It is to be noted that the Figures are not drawn to scale.

FIG. 2 shows typical emission and reception characteristics of a transceiver according to the present invention.

FIG. 3 shows typical emission and reception characteristics of another transceiver according to the present invention.

FIGS. 4A–4D shows schematic two-dimensional projections of the emission characteristics and sensitivity characteristics of four implementation examples, according to the present invention.

DESCRIPTION OF PREFERRED EMBODIMENTS

Figure 1A:
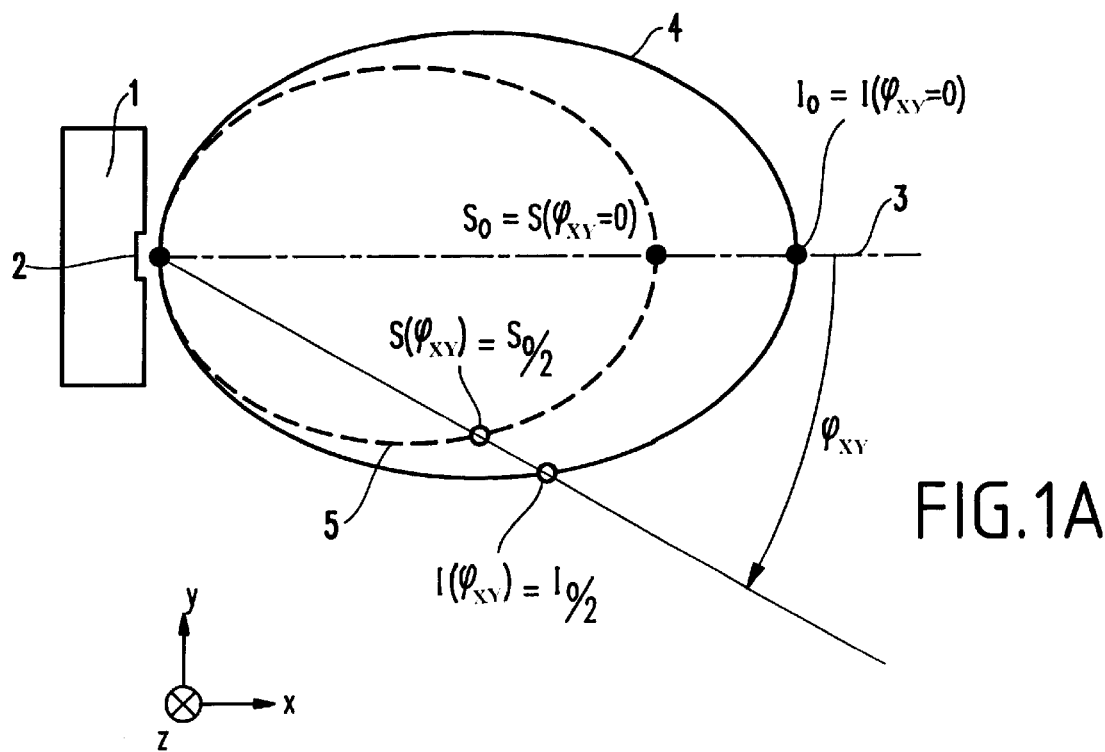
FIG. 1A is a schematic representation (top view) of the optical emission characteristic and optical reception characteristic (both in the far field) of a first embodiment, in accordance with the present invention.
Figure 1B:
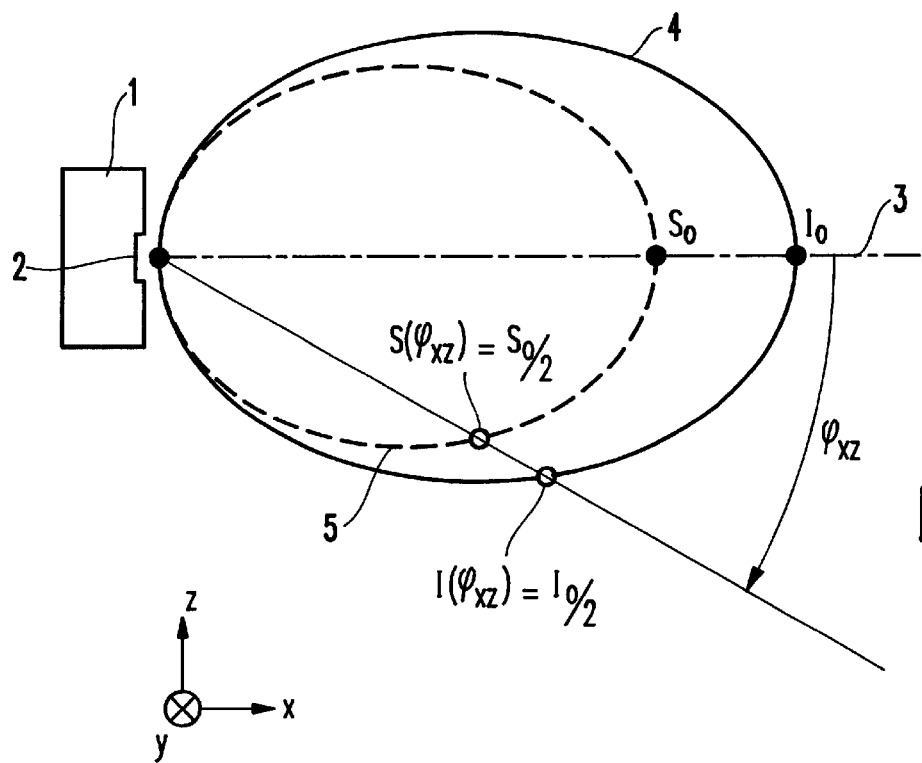
FIG. 1B is a schematic representation (side view) of the optical emission characteristic and optical reception characteristic (both in the far field) of the first embodiment shown in FIG. 1A.

FIGS. 1A and 1B show a simplified representation of a transceiver 1, in accordance with the present invention. The angular emission characteristic 4 (solid line) and reception characteristic 5 (dashed line) of the transceiver's transmitter and receiver are depicted. The radiant intensity I (in mW/sr) of the optical emitter being part of the transmitter, and the sensitivity S (in $\mu A/mW/cm^2$) of the receiver's optical detector correspond to peak values measured under predefined conditions (e.g. for optical test pulses with 125 ns width).

The optical parity is defined as the dimension-less ratio K of relative radiant intensity $I/I_0$ and relative sensitivity $S/S_0$ of the optical port 2, or in form of an equation: $K=(I/I_0)/(S/S_0)$. The reference points are referred to as radiant intensity $I_0$ and sensitivity $S_0$, measured on the optical port axis 3, respectively. The optical port axis 3 is the normal to the active photodiode area (not shown in FIGS. 1A and 1B). For optical ports supporting more than one photodiode with different respective port axes the same definition applies, but a suitable reference point has to be chosen.

The optical parity requirement is fully met if the ratio K' of the transmitter's radiant intensity I and the receiver's sensitivity S is constant (K'=I/S) and remains constant under all operating conditions. These conditions are specified mainly by direction (angles $\psi_{xy}$ and $\psi_{xz}$), temperature, and data transmission rates. Note that K is a normalized quantity and so is useful in comparing the shapes of the transmitter and receiver characteristics without considering the actual values of I and S, whereas K' is an absolute quantity. The ratio K' is useful since optical parity is fully met if this ratio is a constant. Since only the ratio $K'=I_0/S_0$ is required to remain constant, transceivers with different properties (such as transmission range and angular range) can be built while still maintaining mutual channel symmetry. For example, long-range terminals with high intensity AND high sensitivity or power saving short-range terminals with low intensity AND low sensitivity would maintain channel symmetry as long as the ratio K' is the same for all transceivers in the system channel In order to meet the temperature condition, the thermal response of transmitter and receiver must be equal or similar. The optical parity requirement can be met by transceivers containing a semiconductor emission unit and a semiconductor detecting unit whose thermal response is equal or at least similar. The same is valid for data transmission rates if the response time of the optical units is equal or at least similar. The response to these two operating parameters depends largely on the semiconductor technology employed. The most important and most difficult requirement for full compliance with the optical parity requirement is the constant ratio K of transmission intensity and receiver sensitivity at various spatial directions. There are several different cases to be considered.

With a strict interpretation of the optical parity requirement, the optical emission characteristic (influenced by the shape of the transceiver's housing, the size and shape of the optical port in this housing through which light is emitted, the number and arrangement of light emitting diodes, and other parameters) and the optical reception characteristic (also influenced by the shape of the transceiver's housing, the size and shape of the optical port in this housing through which light is received, the number and arrangement of photodetectors, and other parameters) must be identical. In other words, the optical parity requirement is fully complied with if the shape of the envelope (usually a cone) describing the optical emission characteristic is equal to the shape of the envelope (usually a cone) describing the optical reception characteristic. The transceiver of FIGS. 1A and 1B is in full compliance with the optical parity concept. As can be seen in FIG. 1A, the envelope 4 outlining the transmitter's optical emission characteristic and the envelope 5 outlining the optical reception characteristic have the same shape in the horizontal plane (x-y plane). The envelopes have the same shape in the vertical plane (x-z plane), too, as can be derived from FIG. 1B. The ratio $K=(I/I_0)/(S/S_0)$ is thus constant within the horizontal plane as well as the vertical plane.

In the application shown in FIGS. 1A and 1B, the transceiver 1 contains a semiconductor transmitter which emits through the optical port 2. The optical port 2 might be a simple opening in the transceiver's housing, or the optical port 2 might comprise a lens or other means which define the geometric optics of the transceiver 1. The optical port 2 together with the light emitting element(s), such as light emitting diode(s), for example, define the optical emission characteristic 4 of the transceiver 1. They also define the maximum signal intensity $I_0$. The envelope outlining the optical emission characteristic 4 is conical or spherical in the present example, and has a circular cross-section (in the y-z plane) in this first embodiment. The optical emission characteristic 4 shows the relative signal intensity depending on the spatial direction and with respect to the optical axis 3 (the optical axis is sometimes also referred to as port axis). A very important feature of the optical emission characteristic 4 is the transmitter's half-angle $\psi_S$, which describes the spatial angle with respect to the optical axis 3, at which the relative value of the signal intensity $I(\psi)$ has dropped to $I_0/2$. The transmitter's half-angle $\psi_{Sxy}$ is referred to as horizontal emission angle, because it is measured with respect to the horizontal (x-y plane). The transmitter's half-angle $\psi_{Sxz}$ is referred to as vertical emission angle, because it is measured with respect to the vertical (x-z plane). Note that the horizontal emission angle $\psi_{Sxy}$ does not have to be equal to the vertical emission angle $\psi_{Sxz}$.

In addition to the transmitter, the transceiver 1 contains a semiconductor receiver (not shown) which in conjunction with the optical port 2 defines the optical characteristic of the receiver. The optical reception characteristic 5 of the receiver depends on the optical port 2, the kind and arrangement of detector(s) used inside the transceiver's housing, and other factors. The envelope of the optical reception characteristic 5 might have almost any shape, but usually it is conical to spherical, and has an oval or circular cross-section (in the y-z plane). The optical reception characteristic 5 shows the relative height of the receiver's sensitivity S depending on the spatial direction $\psi$ and with respect to the optical axis 3. A very important feature of the optical reception characteristic 5 is the receiver's half-angle $\psi_E$ which describes the receiver's half-angle with respect to the optical axis 3, at which the relative value of the reception sensitivity S has dropped to half ($S_0/2$). The receiver's half-angle $\psi_{Exy}$ is referred to as horizontal sensitivity angle, because it is measured with respect to the horizontal (x-y plane). The receiver's half-angle $\psi_{Exz}$ is referred to as vertical sensitivity angle, because it is measured with respect to the vertical (x-z plane). Note that the horizontal sensitivity angle $\psi_{Exy}$ does not have to be equal to the vertical sensitivity angle $\psi_{Exz}$.

No practical system is 100% compliant with the optical parity concept. Any mismatch of the two envelopes outlining the transmitter's optical emission characteristic and the receiver's optical reception characteristic results in a ratio K which is not constant. The ratio K might vary with transmission angle, for example. In order to be able to describe systems which are not strictly compliant with the optical parity concept, an optical parity tolerance is introduced. An optical parity tolerance can be defined for the horizontal plane and the vertical plane.

The optical parity tolerance should comply with a so-called tolerance mask. For every direction within the horizontal plane the value of the optical parity should be within such a tolerance mask. A tolerance mask might be based on a compromise between the results of measured samples with unselected light emitting diodes (transmitter) and photodiodes (receiver), and desirable low tolerance values. Depending on the circumstances, no tolerance window needs to be defined in the vertical plane. In such a case, one might, however, define that the vertical half-power angle of the transmitter should be at least as large as the vertical half-power angle of the receiver. To illustrate and define the optical parity tolerance, one might use a diagram in which the relative intensity $I/I_0$ is depicted as a function of the relative sensitivity $S/S_0$. In such a diagram, the ratio K is a line. The upper and lower tolerance can be depicted as sloped lines. The window between these lines defines the 'acceptable area', whereas any point outside this 'acceptable area' is deemed to be unacceptable, because the tolerance is exceeded. Such a diagram can be used to qualify transceivers.

The minimum requirement in a not so strict interpretation of the optical parity concept is that at least the horizontal or vertical half-power angle of the transmitter $\psi_S$ (measurement of the emission angle respective to horizontal or vertical) be identical or almost identical to the horizontal or vertical half-power angle FE (measurement of the reception angle relative to horizontal or vertical).

The background for the minimum requirement is that in reality the alignment of a transmitter communicating with a remote receiver usually takes place either in horizontal or in vertical direction. If both the transmitter and the receiver are situated on a horizontal table (a table in the x-y plane), it is sufficient that the transmitter's horizontal half-power angle $\psi_{Sxy}$ is equal or approximately equal to the receiver's horizontal half-power angle $\psi_{Exy}$ in order to meet the optical parity requirement in its not so strict interpretation.

In the best mode implementation according to the present invention, the receiver's horizontal half-power angle $\psi_{Exy}$, the receiver's vertical half-power angle $\psi_{Exz}$, the transmitter's horizontal half-power angle $\psi_{Sxy}$, and the transmitter's vertical half-power angle $\psi_{Sxz}$ would all be equal. In other words, in this case, the envelope used to illustrate the optical emission characteristic and the envelope used to illustrate the optical reception characteristic would have the same shape. Furthermore, the shape of cross-section (in the y-z plane) of the transmitter's envelope and the cross-section (in the y-z plane) of the receiver's envelope would be the same. This best mode implementation ensures that optical parity exists in any spatial direction.

According to another embodiment of the present invention, a transmitter and a receiver are provided that form an optical communication system. The transmitter's optical emission characteristic and the receiver's optical reception characteristic at least need to fullfill one of the following requirements:

A. the receiver's horizontal half-power angle $\psi_{Exy}$ is equal or approximately equal to the transmitter's horizontal half-power angle $\psi_{Sxy}$; or B. the receiver's vertical half-power angle $\psi_{Exz}$ is equal or approximately equal to the transmitter's vertical half-power angle $\psi_{Sxz}$; or C. the receiver's horizontal half-power angle $\psi_{Exy}$ is equal or approximately equal to the transmitter's horizontal half-power angle $\psi_{Sxy}$, and the receiver's vertical half-power angle $\psi_{Exz}$ is equal to the transmitter's vertical half-power angle $\psi_{Sxz}$; or D. the receiver's horizontal half-power angle $\psi_{Exy}$ is equal or approximately equal to the transmitter's horizontal half-power angle $\psi_{Sxy}$, and equal or approximately equal to the receiver's vertical reception angle $\psi_{Exz}$, and equal or approximately equal to the transmitter's vertical emission angle $\psi_{Sxz}$.

Instead of defining the transmitter's optical emission characteristic and the receiver's optical reception characteristic by means of vertical and horizontal angles, one might define the characteristics by means of the shape of the transmitter's transmission envelope (e.g. cone 4, see FIGS. 1A and 1B) and the receiver's sensitivity envelope (e.g. cone 5, see FIGS. 1A and 1B). Please note that the size of these cones can only be compared if the sensitivity S and the intensity I are put into relation. The transmitter's optical emission characteristic and the receiver's optical reception characteristic at least need to fulfill one of the following requirements:

i. the shape of the transmitter's optical emission characteristic projected onto the horizontal plane is similar or equal to the shape of the receiver's optical reception characteristic projected into the horizontal plane; or ii. the shape of the transmitter's optical emission characteristic projected onto the vertical plane is similar or equal to the shape of the receiver's optical reception characteristic projected onto the vertical plane; or iii. the shape of the transmitter's optical emission characteristic is similar or equal to the shape of the receiver's optical reception characteristic.

Any optical communication system whose transmitter(s) and receiver(s) meet the above conditions iii. or D. fully comply with the optical parity concept promulgated by the new AIR standard. In other words, an optical communication system fully complies with the optical parity concept if it has a receiver with a three-dimensional sensitivity envelope which matches the shape of the transmitter's three-dimensional emission envelope.

Any other implementations according to the present invention (systems meeting conditions A.–C., or i.–ii.) are not fully compliant with the optical parity concept.

Typical emission and reception characteristics (also referred to as emission envelope and reception envelope) are illustrated in FIGS. 2 and 3. In these two figures, the transmitter's relative radiant intensity $I/I_0$ is depicted by solid dots, and the receiver's relative sensitivity $S/S_0$ by blank dots. The two-dimensional projection of the emission and reception characteristics are depicted as a function of the angle (polar plot). The match between the transmitter's emission characteristic and the receiver's reception characteristic has been analyzed (ratio K) and is depicted as optical parity curve in the lower half of FIGS. 2 and 3.

The transceiver whose emission and reception characteristic is shown in FIG. 2, comprises a transmitter with 3 light emitting diodes and a receiver with one photodiode. The two characteristics are very similar, and the optical parity is almost constant for all angles (symmetry with respect to center point). The photodiode reception characteristic is Lambertian and the emission characteristic is formed by three equal-intensity emitters with 30 degree half-power angle. The optical axes of the emitters are at 0 degree, and ±40 degree with respect to the port axis, respectively.

In FIG. 3, the emission and reception characteristic of another transceiver is shown. This transceiver comprises four light emitting diodes and one photodiode. As can be seen, the emission characteristic shows a more uneven distribution of the relative intensity. In this embodiment, the four LEDs are driven with equal peak currents, and have half power angles of approximately 18 degree. The emission axes (optical axes of the light emitting diodes) are at −45, −15, +15, +45 degree with respect to the port axis. The employed photodiode has an integrated lens and shows a near Lambertian reception characteristic. The optical parity (ratio K), depicted in the lower half of FIG. 3, is not constant, nor is it symmetric relative to the optical axis.

Further examples of how the photodiodes reception characteristic can be matched by employing a set of light emitting diodes, are illustrated in FIGS. 4A–4D. A transceiver in accordance with the present invention can be described by its optical emission and reception characteristic. The transmitter's optical emission characteristic can be described by a three-dimensional emission envelope and the receiver's optical reception characteristic can be described by a three-dimensional sensitivity envelope. In an ideal implementation, the shape of said transmitter's three-dimensional emission envelope matches the shape of said receiver's three-dimensional sensitivity envelope in all three dimensions. Possible implementations with optical transceiver parity are illustrated in FIGS. 4A–4D.

Figure 4A:
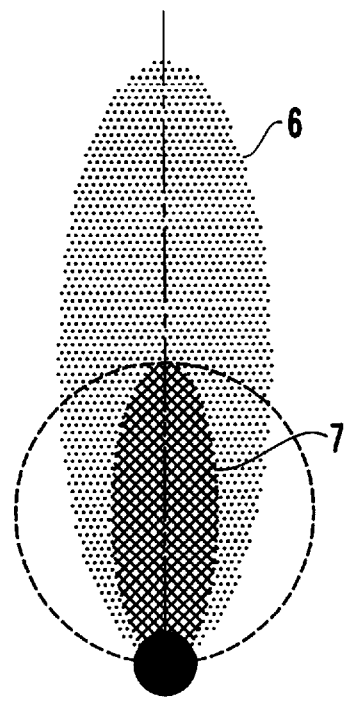

In FIG. 4A, a two-dimensional projection of the three-dimensional emission envelope and the three-dimensional sensitivity envelope of a first transceiver are illustrated. The subject transceiver comprises one light emitting diode and one photodiode, as well as a narrow-angle port. The two cones 6 and 7 are similar in shape. Note that in these figures the transceiver is shown as a black spot for sake of simplicity.

Figure 4B:
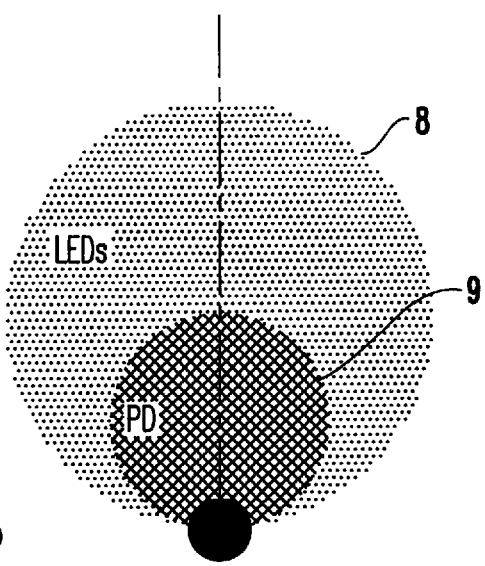

A two-dimensional projection of another transceiver implementation is illustrated in FIG. 4B. This transceiver comprises three light emitting diodes and one photodiode. The two cones 8 and 9 are similar in shape. By this particular arrangement of the optical elements a 120 degrees is obtained.

The third transceiver implementation (FIG. 4C) comprises six light emitting diodes and two photodiodes arranged such that a 240 degrees port is obtained. The two cones 10 and 11 are similar in shape.

A transceiver with 360 degrees port is shown in FIG. 4D. This transceiver comprises nine light emitting diodes and three photodiodes. The two cones 12 and 13 are similar in shape.

The more light emitting diodes are employed, the more difficult it usually is to provide a receiver with a reception characteristic that matches the emission characteristic.

In order to improve the emission and/or reception characteristic, one might employ lenses and other means to shape the characteristics. In addition, the light emitting diodes and/or photodiodes might be arranged to provide for a more homogeneous characteristic. To even out the emission characteristic, one might drive the respective diodes at different power. This allows to reduces certain peaks in the emission characteristic. Likewise, one might employ several photodiodes with different sensitivity.

Further applications can be realized with conventional transceivers with non-matched emission and reception characteristics. These conventional transceivers can be modified by a variation of the emission angle or by mounting additional components, until the emission characteristic and the reception characteristic and the respective transmitter's half-angle and the receiver's half-angle matched.

What is claimed is:

1. An optical wireless communication system comprising a transmitter and a receiver, wherein said transmitter has an optical emission characteristic described by an emission angle ψs, wherein the emission angle ψs is a planar angle that defines where the power emitted by the transmitter is half the power of the power on the transmitter's optical axis, and wherein said receiver has an optical reception characteristic described by a reception angle $\psi_E$, wherein the reception angle $\psi_E$ is a planar angle that defines where the receiver's sensitivity is half the sensitivity of the sensitivity on the receiver's optical axis, said optical wireless communication system being characterized in that the emission angle ψs is approximately equal to the reception angle $\psi_E$, when measured on the same plane for at least one measurement plane.

2. The communication system of claim 1, wherein said transmitter and said receiver are both part of a transceiver.

3. The communication system of claim 1, wherein the ratio of the transmitter's relative radiant intensity ($I/I_0$) with respect to the receiver's relative optical sensitivity ($S/S_0$) is approximately constant (K=1), and wherein the ratio of said emitter's radiant intensity Io with respect to said receiver's optical sensitivity So is approximately constant (K').

4. An optical wireless communication system as defined by claim 1, wherein at least one of said optical emission characteristic or said reception characteristic is established by a lens.

5. An optical wireless communication system comprising a transmitter and a receiver, wherein said transmitter has an optical emission characteristic described by an emission angle ψs, wherein the emission angle ψs is a planar angle that defines where the power emitted by the transmitter is half the power of the power on the transmitter's optical axis, and wherein said receiver has an optical reception characteristic described by a reception angle $\psi_E$, wherein the reception angle $\psi_E$ is a planar angle that defines where the receiver's sensitivity is half the sensitivity of the sensitivity on the receiver's optical axis, said optical wireless communication system being characterized in that the emission angle $\psi_S$ is approximately equal to the reception angle $\psi_E$, when measured on the same plane for at least one measurement plane, wherein said transmitter's optical emission characteristic is described by a three-dimensional emission envelope and wherein said receiver's optical reception characteristic is described by a three-dimensional sensitivity envelope, and wherein the shape of said transmitter's optical emission characteristic approximately matches the shape of said receiver's optical reception characteristic, and wherein said matching of shape is defined by the equation $K=(I/I_0)/(S/S_0)$, where I is the radiant intensity of said transmitter, $I_0$ is said transmitter's radiant intensity on the optical axis, S is the sensitivity of the said receiver, and $S_0$ is the sensitivity of said receiver on the optical axis.

6. The communication system of claim 5, wherein K=1 and wherein K'=Io/So is a predetermined constant applicable for all transceivers in the network.

7. The communication system of claim 6, wherein said transmitter's optical emission characteristic has a first cone-like envelope and wherein said receiver's optical reception characteristic has a second cone-like envelope, and wherein a two-dimensional projection of said first cone-like envelope on at least one plane and said second cone-like envelope on the same said plane are approximately equal in shape, as determined by said equation K, and constant K'.

8. A transceiver, for use in an optical wireless communication system, comprising a transmitter and a receiver, wherein said transmitter has an optical emission characteristic described by a three-dimensional emission envelope and wherein said receiver has an optical reception characteristic described by a three-dimensional sensitivity envelope, and wherein the shape of said transmitter's optical emission characteristic approximately matches the shape of said receiver's optical reception characteristic, wherein said matching of shape is defined by the equation $K=(I/I_0)/(S/S_0)$, where I is the radiant intensity of said transmitter, $I_0$ is said transmitter's radiant intensity on the optical axis, S is the sensitivity of said receiver, and $S_0$ is the sensitivity of said receiver on the optical axis.

9. The transceiver of claim 8, wherein K=1 and wherein K'=Io/So is a predetermined constant applicable for all transceivers in the network.

10. The transceiver of claim 9, wherein said transmitter's optical emission characteristic has a first cone-like envelope and wherein said receiver's optical reception characteristic has a second cone-like envelope, and wherein a two-dimensional projection of said first cone-like envelope on at least one plane and said second cone-like envelope on the same said plane are approximately equal in shape, as determined by said equation K, and constant K'.

11. The transceiver of claim 8, wherein said transmitter comprises at least two light emitting diodes and said receiver comprises at least one photodiode.

12. The transceiver of claim 11, wherein at least one of said at least two light emitting diodes is driven at a different power level to obtain said matching.

13. The transceiver of claim 11, further comprising at least two photodiodes and at least one of said photodiodes has a different sensitivity to obtain said matching.

14. The transceiver of claim 8, wherein the transmitter comprises at least one light emitting diode and said receiver comprises at least one photodiode, and wherein the response time of the light emitting diode is approximately equal to the response time of the photodiode.

15. The transceiver of claim 8, wherein the transmitter comprises a semiconductor emission unit and said receiver comprises a semiconductor detecting unit, and wherein the thermal response of the semiconductor emission unit is approximately equal to the thermal response of the semiconductor detecting unit.

16. The transceiver of claim 8, wherein the transmitter and the receiver share the same port.

\* \* \* \* \*